Nov. 11, 1969    J. O. JUST ET AL    3,477,213
AQUATIC PICKUP AND UNLOADING APPARATUS

Filed July 28, 1967    4 Sheets-Sheet 1

INVENTORS
JEROME O. JUST
HOWARD W. STERN

BY

ATTORNEY

Nov. 11, 1969　　　J. O. JUST ET AL　　　3,477,213
AQUATIC PICKUP AND UNLOADING APPARATUS
Filed July 28, 1967　　　　　　　　　　　　4 Sheets-Sheet 2

INVENTORS
JEROME O. JUST
HOWARD W. STERN
BY
Thomas W. Sherman
ATTORNEY

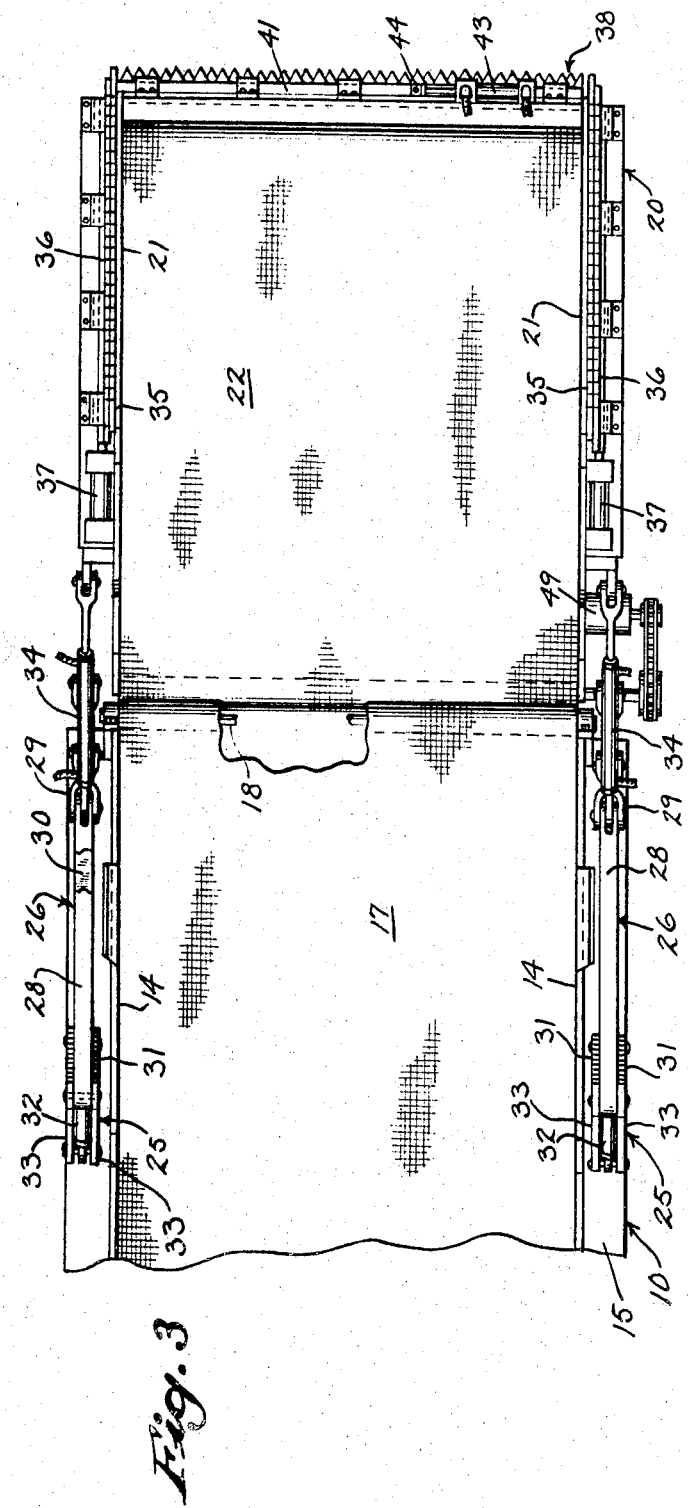
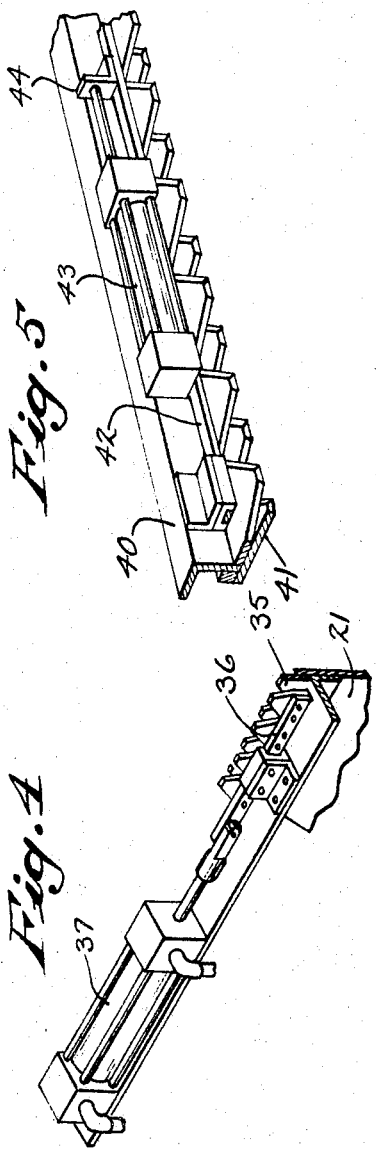
INVENTORS
JEROME O. JUST
HOWARD W. STERN
ATTORNEY

INVENTORS
JEROME O. JUST
HOWARD W. STERN

BY Thomas W. Ehrmann

ATTORNEY

United States Patent Office

3,477,213
Patented Nov. 11, 1969

3,477,213
AQUATIC PICKUP AND UNLOADING APPARATUS
Jerome O. Just, Sturtevant, and Howard W. Stern, Milwaukee, Wis., assignors to Aquatic Controls Corporation, Hartland, Wis., a corporation of Wisconsin
Filed July 28, 1967, Ser. No. 656,865
Int. Cl. A01d 55/16; B63b 27/00
U.S. Cl. 56—9                                    9 Claims

ABSTRACT OF THE DISCLOSURE

A propelled aquatic barge has a forward deck with side panels arising from the sides of the deck and with a reversably drivable wire mesh bed conveyor belt overlying the deck between the side panels. A pickup and unloading assembly including a pair of spaced side walls and a reversably drivable wire mesh forward conveyor belt is disposed between the side walls and supported thereby. The assembly projects forward of the barge and is pivotally secured at its rear to a pair of linkages which connect to opposite sides of the barge, and hydraulic cylinders are operable on the linkages to rotate the pivotal connection of the assembly to the linkages and thereby adjust the position of the assembly between a pickup position in which the aft end of the forward conveyor belt is above and aft of the forward end of the bed conveyor belt and an unloading position in which the aft end of the forward conveyor belt is below and aft of the forward end of the bed conveyor belt. The elevation of the assembly relative to its pivotal connection to the linkage is adjustable by hydraulic cylinders which connect the side walls of the assembly to the linkages. A vertical reciprocating cutter is disposed on the forward edge of each side wall of the assembly and a horizontal reciprocating cutter is disposed adjacent the forward edge of the forward conveyor belt. The horizontal cutter is mounted on the assembly for retraction in an aft direction to remove it from the forward end of the forward conveyor belt when the forward conveyor belt is used to unload. A hydraulic control system is provided to control the operation of the hydraulic cylinders for changing the position and elevation of the pickup and unloading assembly, to drive hydraulic motors for the conveyor belts in selected directions, and to reciprocatively drive hydraulic cylinders for operating the cutters. The hydraulic control system provides for automatic retraction of the horizontal cutter when the forward conveyor belt is driven in a forward direction to unload material from the barge.

BACKGROUND OF THE INVENTION

This invention relates to an aquatic pickup and unloading apparatus, and more particularly to a propelled craft which will cut aquatic weeds, pickup the cut weeds or other floating debris and refuse, load the material onto the craft, and unload the material from the craft.

Water pollution of our streams and lakes has resulted in serious aquatic weed problems. These weeds are often attempted to be controlled by the use of chemicals. Another, more effective, means of controlling the weeds is to harvest the same. That is, the weeds are cut and removed from the body of water. The removed weeds can be used for animal feed. Apparatus previously in use or proposed to accomplish such harvesting of aquatic weeds have required the use of multiple crafts. That is, one craft to sever and remove the weeds from the water and a second craft upon which the removed material is loaded for transportation to the shoreline. Then, yet another apparatus may be necessary to remove the material from the transporting craft onto land. Several operators are obviously required for carrying out such activities, and the total process can be quite slow.

The apparatus of this invention provides an effective and efficient means for harvesting the aquatic weeds, for loading them onto the craft, and then for unloading the material from the craft directly to the shore. The apparatus of this invention can be operated by one man and the capital investment as well as the labor costs for policing a given body of water are materially reduced over those which would prevail by the use of prior art devices.

The horizontal cutter may be mounted for retraction to a position aft of the forward end of the forward conveyor means so that the horizontal cutter does not present an obstacle to the unloading of material from the assembly.

SUMMARY OF THE INVENTION

An aquatic pickup and unlading apparatus in accordance with the invention comprises a propelled aquatic craft having a forward deck with spaced side panels, reversable bed conveyor means overlying the deck between the side panels, a pickup and unloading assembly including reversable forward conveyor means disposed between the spaced side walls, with mounting means pivotally connecting the assembly to the forward end of the craft and actuating means for rotating the mounting means to shift the assembly between a pickup position in which the aft end of the forward conveyor means is above and aft of the forward end of the bed conveyor means and an unloading position in which the aft end of the forward conveyor means is below and aft of the forward end of the bed conveyor means.

The invention also includes the provision of vertical cutters on the leading edges of the side walls of the assembly and a horizontal cutter adjacent the forward end of the forward conveyor means, and further contemplates the provision of means for adjusting the elevation of the assembly relative to its mounting to the craft. Thus, with the assembly in its pick-up position the forward end of the assembly may be submerged to selected depths to have the horizontal cutter sever aquatic weeds which will be picked up by the forward conveyor belt and deposited on the bed conveyor means. Or, the forward end of the assembly can be placed in a position in which it will skim the water surface and pick up floating debris. In either event, the vertical cutter will assure that the assembly will not be fouled either by weeds or by debris and the assembly will cut a clean path through the water. With the assembly in its unloading position, its elevation can be adjusted for unloading from the bed conveyor means and over the forward conveyor means either directly to shore or, at a greater elevation, to a truck or shore.

BRIEF DESCRIPTION OF THE DRAWINGS

FIG. 3 is a top plan view of the portion of the craft illustrated in FIG. 2; FIG. 4 is a view in perspective of a portion of a vertical cutter; FIG. 5 is a view in perspective of a portion of the horizontal cutter.

DESCRIPTION OF THE PREFERRED EMBODIMENT

Figure 1:
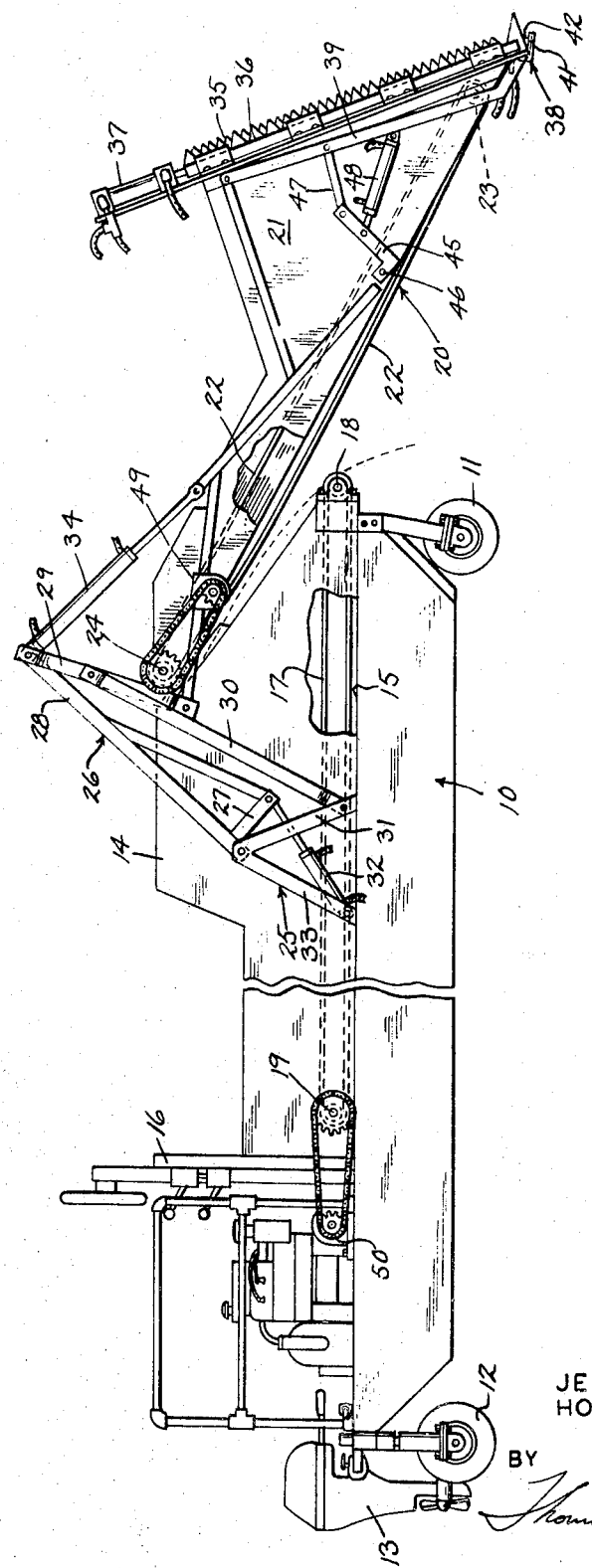
FIG. 1 is a side view in elevation of an aquatic craft in accordance with the invention with the pickup and unloading assembly shown in its pickup position.

Referring now to the drawings, the invention is shown incorporated in an emphibious barge designated generally by the numeral 10. The barge 10 may utilize the land propulsion system described in our copending application Ser. No. 451,416, filed Apr. 28, 1965, for "Hydraulic Propulsion System," and now Patent No. 3,348,624. For land travel, the barge 10 includes forward driving wheels 11 and aft steering wheels 12. The driving wheels 11 are powered by hydraulic motors and the steering wheels 12 are actuated hydraulically. The barge 10 may be propelled through the water by an inboard-outboard motor or by industrial engines with stern drives 13.

Side panels 14 rise from the deck 15 of the barge 10 adjacent the sides thereof and extend from the forward end to a control panel partition 16. A horizontal, bed conveyor belt 17 is disposed over the deck 15 of the barge in the area defined by the side panels 14 and the partition 16. The bed conveyor belt 17 is formed of linked metal mesh and extends around a forward idler sprocket shaft 18 journaled in bearing blocks on the forward end of the side panels 14, and an aft driver sprocket shaft 19 journaled in the side panels 14. Alternately, a plurality of bed conveyors in series may be employed.

A pickup and unloading assembly 20 is comprised of fabricated side walls 21 that are spaced apart a distance generally equal to the spacing of the side panels 14. A forward conveyor belt 22 extends along the assembly 20 between the side walls 21. The forward conveyor belt 22 is also formed of linked metal mesh and extends around an idler sprocket shaft 23 and a driver sprocket shaft 24. The idler shaft 23 and driver shaft 24 are journaled at opposite ends in the side walls 21.

The pickup and unloading assembly 20 is mounted on the forward end of the barge 10 by a pair of linkages. The linkages are each secured to inverted V-shaped standards 25 mounted at the side edges of the deck 15. A bell crank lever 26, having a short arm 27 and a long arm 28, has its apex pivotally connected to the apex of each standard 25. The long arm 28 is pivotally connected to one end of a connecting member 29 that is pivotally connected at its other end to each side wall 21. A brace 30 is pivotally connected between the bottom of the forward leg 31 of the standard 25 and an intermediate point on the connecting member 29.

A pair of shift hydraulic cylinders 32 have their blind ends pivoted to the bottom of each aft leg 33 of the standards 25 and their rod ends pivotally attached to the short arm 27 of each bell crank lever 26. A pair of tilt hydraulic cylinders 34 are similarly pivotally conected between the side walls 21 and the end of each connecting member 29 that is connected to the long arm 28.

The leading edges of the side walls 21 of the pickup and unloading assembly mount vertical sickle-bar cutters of the type shown and described in our copending application Ser. No. 556,641, filed June 10, 1966, for "Aquatic Weed Cutter." Generally, the vertical cutters each include a stationary toothed cutter 35 affixed along the leading edge of a side wall 21 and a movable toothed cutter 36 slidably mounted in contact with the stationary toothed cutter 35 and adapted to be reciprocated relative to said stationary cutter 35. A vertical hydraulic cutter cylinder 37 is mounted at the top of each side wall 21 and has its rod connected to the respective movable toothed cutter 36 (see FIG. 4).

A retractable horizontal cutter assembly 38 is mounted at the forward ends of the side walls 21. The horizontal cutter assembly 38 includes a frame formed of a pair of side arms 39 rising from either end of a cross bar 40. The cross bar 40 mounts a horizontal stationary toothed cutter 41, a horizontal movable toothed cutter 42, and a horizontal cutter hydraulic cylinder 43 having its rod connected by means of a bracket 44 to the movable cutter 42 (see FIG. 5). The side arms 39 are disposed to the outside of the side walls 21 and are pivotally mounted thereto at their upper ends. On each side of the horizontal cutter assembly 38, a crank lever 45 has its short arm pivotally mounted on a stub torsion shaft 46 projecting from the side wall 21. A link 47 is pivotally connected between the long leg of the crank lever 45 and an intermediate point on a respective side arm 39. A safety hydraulic cylinder 48 has its blind end secured to one side wall 21 and its rod pivotally connected to an intermdeiate point on the long leg of one crank lever 45.

The aft portion of the deck 15 beyond the control panel partition 16 serves to mount an engine and hydraulic equipment powered by the engine, such as pumps, motors and necessary valving, for driving and steering the barge 10 on land and for driving the conveyor belts 17 and 22 and powering the cylinders when afloat. Such portion of the deck also functions as an operator's station.

The linkages and shift cylinders 32 can position the pickup and unloading assembly 20 at two extreme positions and at desired intermediate positions, all of which are defined by the position of the aft end of the forward conveyor belt 22 relative to the forward end of the bed conveyor belt 17. With the shift cylinders 32 fully extended, the assembly 20 is placed in a loading position shown in FIG. 1 wherein the act end of the forward conveyor belt 22 is above and overlapping the bed conveyor belt 17. With the shift cylinders 32 fully retracted, the assembly 20 is placed in its unloading position in which the aft end of the forward conveyor belt is below and aft of the forward end of the bed conveyor belt 17 (see FIG. 2). The assembly 20 may also be placed in intermediate positions such as with the aft end of the forward conveyor belt 22 level with the bed conveyor belt 17. The elevation of the assembly 20 relative to the aft end thereof is controlled by the tilt cylinders 34.

The general operation of the aquatic pickup and unloading apparatus is as follows.

With the barge 10 being propelled through the water, the pickup and unloading assembly 20 would be placed in its loading position in which it is partially submerged to the desired depth. The submerged depth of the assembly 20 is controlled by the tilt cylinders 34 which will pivot the assembly 20 about its pivotal connection to the connecting members 29. To pick up refuse, floating debris or weeds in the path of the assembly, the forward conveyor belt 22 is actuated to have its top run move upwardly. The forward conveyor belt 22 is chain driven by a hydraulic motor 49 mounted on one side wall 21. Actuation of the motor 49 to drive the forward belt 22 in a pickup direction will also actuate the vertical and horizontal cutter cylinders 37 and 43 to reciprocate the movable cutters 36 and 42, in a manner to be hereinafter explained. The vertical and horizontal cutters will insure that debris and weeds will not drape over and foul the assembly and the horizontal cutter will sever growing weeds for their removal from the water. The refuse, debris or weeds will be picked up by the forward conveyor belt 22 and carried upwardly until they fall from the upper end of the conveyor belt 22 to the bed conveyor belt 17 below. The forward conveyor belt 22 can be positioned above to overlap the bed conveyor belt 17 a considerable distance to insure that the wet material will not fall back into the water even though it may cling for a short distance to the lower run of the forward conveyor belt 22.

After a load of material has been deposited on the bed conveyor belt 17, the upper run of such conveyor belt 17 is selectively advanced in the aft direction for a short distance to present a new area of the belt 17 to receive material. This occurs until the entire upper run of the bed conveyor belt 17 is filled. The bed conveyor belt is chain driven by a hydraulic motor 50 mounted on the deck 15.

To unload the material from the bed conveyor belt 17 the pickup and unloading assembly 20 is first shifted to its unloading position. This is accomplished by retracting the shift cylinders 32 which will cause the bell crank levers 26 to rotate the connecting members 29 about their pivotal connection to the braces 30 and will cause the braces 30 to rotate downwardly toward the deck 15. The result is that the pivot point of the assembly 20 on the connecting members 29 will move through a path shown in broken lines in FIG. 1. The aft end of the forward conveyor belt 22 is thereby placed beneath and slightly aft of the forward edge of the bed conveyor belt 17, and the assembly 20 extends upwardly therefrom. The height of the assembly 20 is controlled by the tilt cylinders 34.

Figure 2:
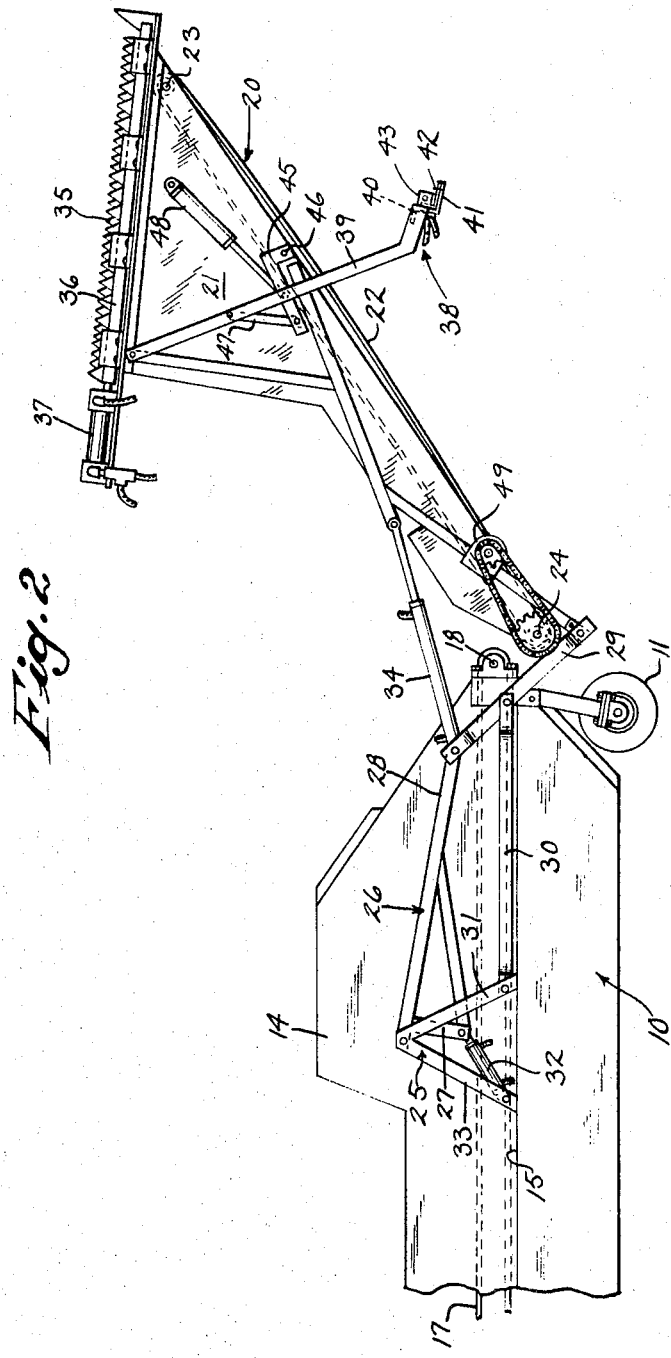
FIG. 2 is a side view in elevation of the front of the craft of FIG. 1 with the pickup and unloading assembly shown in its unloading position.

When the forward conveyor belt 22 is reversed to unload, the cutter cylinders 37 and 43 are automatically deactivated and the horizontal cutter assembly 38 is retracted to a position illustrated in FIG. 2. Retraction of the horizontal cutter assembly 38 is accomplished by extending the safety cylinder 48 to rotate the crank lever 45 and, through the link 47, to rotate the cutter assembly 38 about its pivotal connections to the side walls 21. The horizontal cutters are thereby out of the way of material being discharged from the leading edge of the forward conveyor belt 22.

Unloading is, of course, accomplished by shifting the assembly 20 to its unload position and by reversing the direction of rotation of the belts 17 and 22 to move the material from the bed conveyor belt 17 to the forward conveyor belt 22 which will discharge the material from its end.

Figure 6:
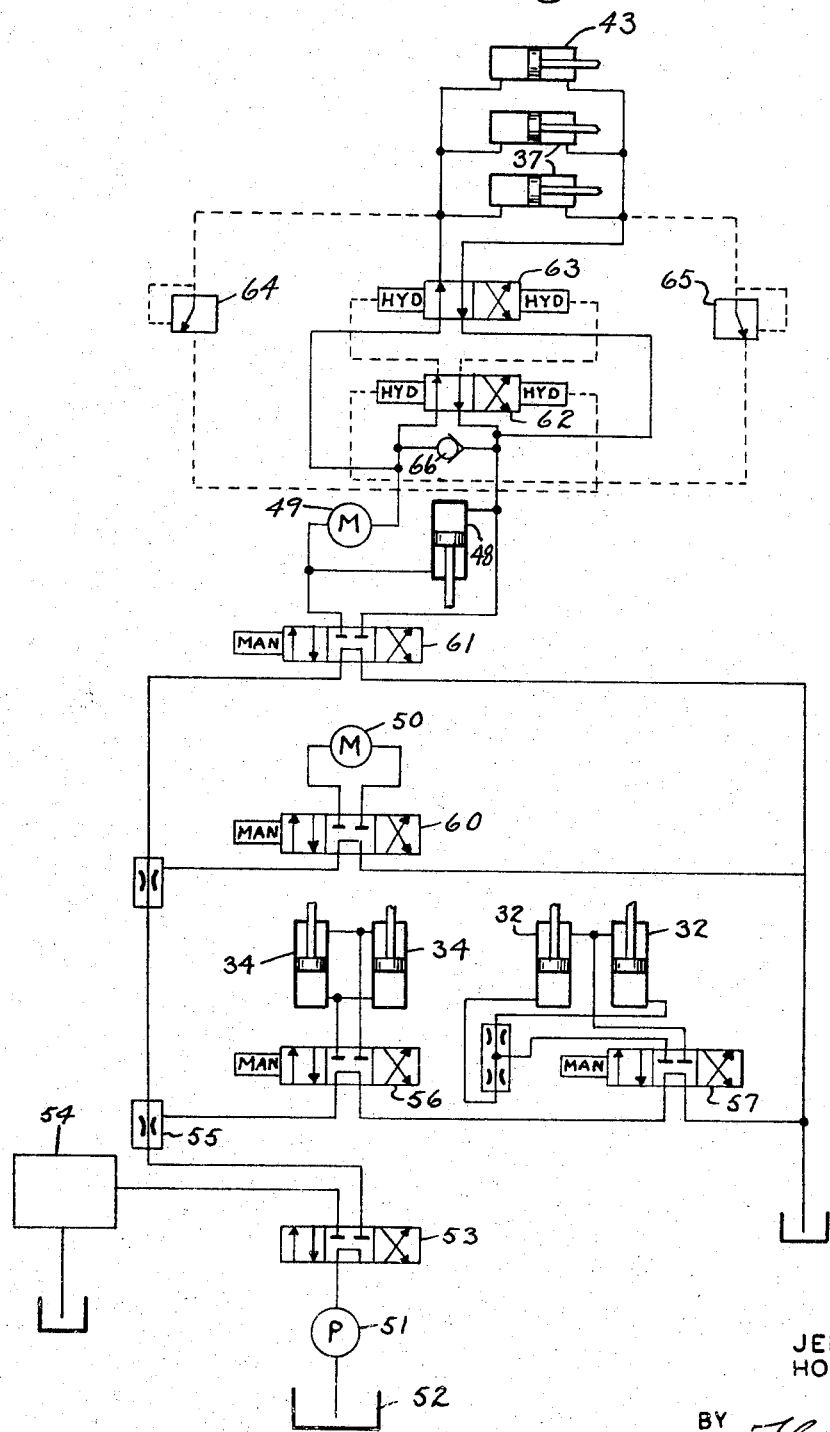
FIG. 6 is a diagrammatic view of the hydraulic control circuit for the craft.

A hydraulic control system for accomplishing the foregoing mode of operation is illustrated in FIG. 6. A pump 51 driven by an engine draws hydraulic fluid from a reservoir 52. A three position direction valve 53 with manual detent will alternately block the flow of hydraulic fluid, direct the fluid to the hydraulic system 54 for the driving and steering of the barge 10 on land, or direct the fluid to the hydraulic system for the water borne operations. The hydraulic system 54 for the land operation of the barge 10 is not shown in detail since this is described in the aforementioned copending application Ser. No. 451,416. Hydraulic fluid under pressure directed to the water borne operations of the barge 10 passes through a first pressure compensated priority type flow control valve 55 having an excess flow vent connected to a three position tilt valve 56, then to a three position shift valve 57, and then to the reservoir.

By shifting the tilt valve 56 to the right as viewed in FIG. 6, fluid under pressure is directed to the blind ends of the tilt cylinders 34 and is exhausted from the rod ends thereof, thereby extending the tilt cylinders and rotating the forward assembly 20 clockwise as viewed in FIG. 1. Shifting the tilt valve 56 to the left, as viewed in FIG. 6, produces the opposite rotation of the assembly 20.

By shifting the shift valve 57 to the right as viewed in FIG. 6, fluid under pressure is directed through a divider-combiner valve 58 to the blind ends of the shift cylinders 32 and fluid is exhausted from the rod ends thereof. This will cause the shift cylinders 32 to expand and, as previously described, shift the forward assembly to its loading position. Shifting of the shift valve to the left will cause the shift cylinders 32 to retract and move the forward assembly to its unloading position.

The first flow control valve 55 also has a constant flow port connected to a second pressure compensated priority type valve 59 having an excess flow port connected to a three position bed conveyor drive valve 60 and a constant flow port connected to a three-position forward conveyor drive valve 61. The bed conveyor drive valve 60 is shiftable to drive the hydraulic motor 50 for the bed conveyor belt 17 in either direction.

The forward conveyor drive valve is shifted to the right as viewed in FIG. 6 to drive the forward conveyor belt 22 in a loading direction to actuate the vertical and horizontal cutters, and to retract the safety cylinder 48. Specifically, fluid under pressure will flow to the rod end of the safety cylinder 48 and will be exhausted from the blind end thereof to retract the safety cylinder 48 and thereby position the horizontal cutter assembly 38 at the forward end of the forward assembly 20. Fluid will also flow through the hydraulic motor 49 to drive the forward conveyor belt 22 in a loading direction and to the rod end of the safety cylinder 48 to retract the same and place the horizontal cutter in a cutting position. From the motor 49, fluid flows to a two position, pilot controlled piloting valve 62 and to a two position pilot controlled reciprocating valve 63. The outlet ports of the reciprocating valve 63 are connected to the blind ends and the rod ends of the cutter cylinders 37 and 43.

The reciprocating valve 63 is shifted back and forth to rapidly change the direction in which fluid under pressure is fed to the cutter cylinders 37 and 43 so that the rods of such cylinders reciprocate to drive the movable toothed cutters 36 and 42. The rapid shifting of the reciprocating valve 63 is effected by the piloting valve 62 which, in turn, is shifted back and forth by relief valves 64 and 65. The relief valve 64 is connected between the blind ends of the cutter cylinders 37 and 43 and one pilot on the piloting valve 62. The other relief valve is connected between the rod ends of the cylinders 37 and 43 and the other pilot of the piloting valve 62. The outlet ports of the piloting valve 62 are connected to respective pilots of the reciprocating valve 63.

It will be appreciated from FIG. 6 that, when the forward conveyor drive valve 61 is shifted to the right, fluid will initially pass to the blind ends of the cutter cylinders 37 and 43 causing them to extend. When the pressure builds to a preselected level, the relief valve 64 will open to actuate its respective pilot on the piloting valve 62. This will shift the piloting valve 62 to the left and direct fluid under pressure to the respective pilot on the reciprocating valve 63 to shift that valve to the left. The rod ends of cutter cylinders 37 and 43 are then subjected to fluid under pressure and such cylinders retract until the pressure increases to the level that opens the relief valve 65, thereby shifting the piloting valve 62 and the reciprocating valve 63 to extend the cutter cylinders 37 and 43. This cycling of the valves 62 and 63 continues as long as the forward conveyor drive valve 61 is shifted to the right.

For unloading, the forward conveyor drive valve 61 is shifted to the left as viewed in FIG. 6. In such position fluid under pressure is fed to the blind end of the safety cylinder 48 to extend the cylinder and thereby retract the horizontal cutter assembly 38. Also, fluid will flow through a check valve 66 to the motor 49 to drive the forward conveyor belt 22 in an unloading direction. Since the check valve 66 is located in advance of the piloting valve 62 and reciprocating valve 63, the cutter cylinders 37 and 43 will not be actuated.

The first and second flow control valves 55 and 59 are manually adjustable to vary the flow through their constant flow ports. In use, whenever the position of the forward assembly 20 is to be either shifted or tilted, the first flow control valve 55 is adjusted to have some fluid flow through its excess flow ports to actuate the tilt cylinders 34 and the shift cylinders 32. Once the forward assembly 20 has been adjusted to its desired position for either loading or unloading, the first flow control valve 55 may be adjusted to have full fluid flow through its constant flow port. Similarly, the second flow control valve 59 can be manually adjusted to have full flow through its excess flow port when the bed conveyor belt 17 is driven in the aft direction. For unloading, the fluid flow is divided between the constant flow and excess flow ports.

It will be appreciated that the apparatus will cut a clean path through the water either to sever and pick up weeds or to pick up floating debris. The vertical cutters prevent weeds from fouling the assembly. The depth at which the weeds are to be cut can be adjusted, and the assembly can be positioned to skim the water surface if only pickup operations are to be performed. The apparatus can be propelled to shore and the projecting pickup and unloading assembly will extend onto shore. The elevation of the assembly for unloading can be adjusted to either deposit the material on the shore or to load the same directly onto a truck. The horizontal cutter is automatically retracted to facilitate unloading.

The use of a full width bed conveyor belt insures that all vegetation cut on three sides is guided and deposited on the deck. The use of the bed conveyor belt eliminates the need for manually stocking material on the deck and the need for auxiliary equipment, such as cranes, for unloading material from the deck.

We claim:
1. An aquatic pickup and unloading apparatus, comprising:
   a propelled aquatic craft having a forward deck and spaced side panels rising from the sides of said deck;
   a bed conveyor means overlying said deck between said side panels and extending aft from the forward end of said craft, said bed conveyor means being selectively actuable to convey in fore and aft directions;
   a pickup and unloading assembly including a pair of spaced side walls and forward conveyor means disposed between said side walls, said forward conveyor means being selectively actuable to convey in fore and aft directions;
   mounting means pivotally connecting the rear of said assembly to the forward end of said craft to have said assembly project forward of said craft;
   and actuating means for rotating said mounting means for shifting said assembly between a pickup position in which the aft end of said forward conveyor means is above and aft of the forward end of said bed conveyor means and an unloading position in which said aft end of said forward conveyor means is below and aft of the forward end of said bed conveyor means.

2. An aquatic pickup and unloading apparatus in accordance with claim 1 wherein actuable elevation means are connected between said assembly and said mounting means, said elevation means being adapted to rotate said assembly about its pivotal connection to said mounting means to vary the elevation of the forward end of said assembly relative to its rear end and to hold said assembly in selected elevations.

3. An aquatic pickup and unloading apparatus in accordance with claim 2 wherein said mounting means comprises a linkage disposed on each side of said craft and pivotally connected at one end to said craft and pivotally connected at the other end to said assembly, said actuating means is connected between said craft and said linkages and rotates said linkages to move the pivotal connection of said assembly to said linkages through an arcuate path.

4. An aquatic pickup and unloading apparatus in accordance with claim 3 wherein said linkages each comprise a connecting member, a bell crank lever having a long leg pivotally connected between said craft and said connecting member, and a brace pivotally connected between said craft and said connecting member and spaced from said long leg, said assembly being pivotally connected to said connecting member, and said elevation means being connected between said connecting members and said assembly.

5. An aquatic pickup and unloading apparatus in accordance with claim 4 wherein said actuating means comprises shift hydraulic cylinders connected between said craft and a short leg of each of said bell crank levers, and wherein said elevation means comprises tilt hydraulic cylinders connected between each connecting member and a respective side wall of said assembly, together with a source of hydraulic fluid under pressure, and control means for controlling the supply of hydraulic fluid to said cylinders for selectively extending and retracting said cylinders.

6. An aquatic pickup and unloading apparatus in accordance with claim 1 together with vertical cutter means mounted on the forward edge of each side wall of said assembly, and horizontal cutter means disposed at the leading forward end of said forward conveyor means.

7. An aquatic pickup and loading apparatus in accordance with claim 6 wherein said horizontal cutter means is mounted on said assembly for retraction from a forward cutting position to a position aft of the forward end of said forward conveyor means wherein said horizontal cutter means is free of the discharge from said assembly when the same is operated to unload.

8. An aquatic pickup and unloading apparatus in accordance with claim 7 wherein said forward conveyor means comprises a conveyor belt driven by a reversable hydraulic motor and a hydraulic cylinder is connected between said assembly and said horizontal cutter means to shift the same between its cutting position and retract position, together with a source of hydraulic fluid under pressure, and control means for selectively feeding hydraulic fluid to said hydraulic motor and said hydraulic cylinder, said control means supplying fluid to said cylinder to retract said horizontal cutter means when said control means is actuated to have said motor drive said conveyor belt in a forward direction.

9. An aquatic pickup and unloading apparatus in accordance with claim 8 wherein said cutter means are driven by cutter hydraulic cylinders, and said control means blocks the flow of fluid to said cutter hydraulic cylinders when said control means is actuated to have said motor drive said conveyor belt in a forward direction.

References Cited

UNITED STATES PATENTS

| | | | |
|---|---|---|---|
| 1,028,671 | 6/1912 | Brooks | 56—9 |
| 2,486,275 | 10/1949 | Grinwald | 56—8 |
| 3,341,039 | 9/1967 | Cranage | 198—94 X |
| 3,349,029 | 10/1967 | Grinwald | 56—9 |

E. BARRY SHAY, Primary Examiner

PASQUALE A. RAZZANO, Assistant Examiner

U.S. Cl. X.R.

214—15

PO-1050
(5/69)

UNITED STATES PATENT OFFICE
CERTIFICATE OF CORRECTION

Patent No. 3,477,213          Dated November 14, 1969

Inventor(s) JEROME O. JUST, HOWARD W. STERN

It is certified that error appears in the above-identified patent and that said Letters Patent are hereby corrected as shown below:

| | | |
|---|---|---|
| Column 1, | Line 56, | for "pickup" read ---pick up--- |
| Column 2, | Line 6, | for "Tre" read ---The--- |
| Column 2, | Line 19, | for "unlading" read ---unloading--- |
| Column 2, | Line 71, | for "emphibious" read ---amphibious |
| Column 4, | Line 4, | for "intermdeiate" read ---intermediate--- |
| Column 4, | Line 20, | for "act" read ---aft--- |
| Column 8, | Line 19, | for "loading" read ---unloading--- |

SIGNED AND
SEALED
MAY 12 1970

(SEAL)
Attest:

Edward M. Fletcher, Jr.
Attesting Officer

WILLIAM E. SCHUYLER, JR.
Commissioner of Patents